T. BELL.
DISTRIBUTER ROLLER BEARING FOR PRINTING PRESSES.
APPLICATION FILED MAR. 23, 1915.
1,179,797. Patented Apr. 18, 1916.
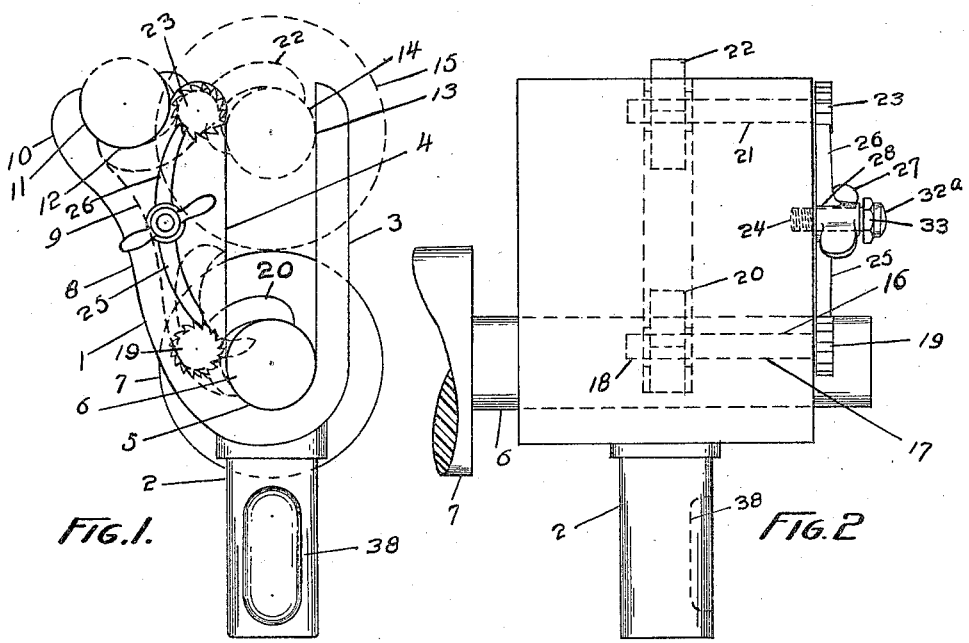
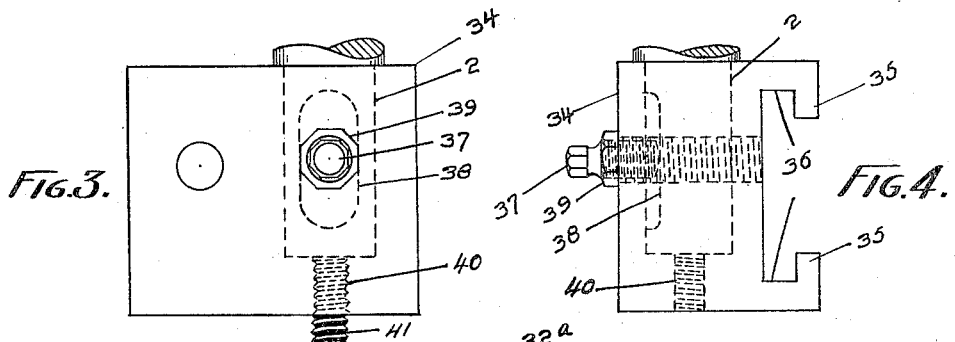
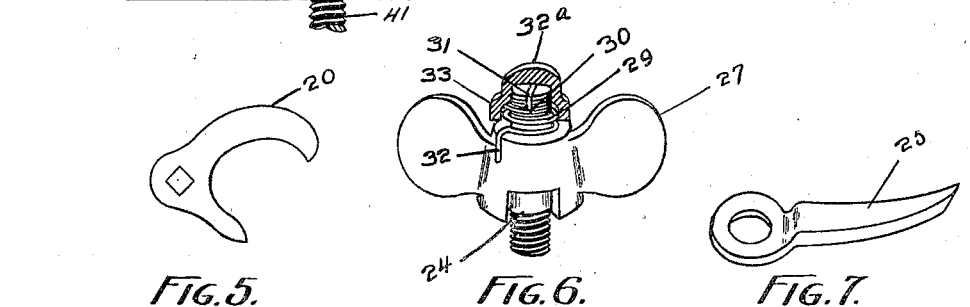
Witnesses
Thomas Bell
Inventor

UNITED STATES PATENT OFFICE.

THOMAS BELL, OF TORONTO, ONTARIO, CANADA.

DISTRIBUTER-ROLLER BEARING FOR PRINTING-PRESSES.

1,179,797. Specification of Letters Patent. Patented Apr. 18, 1916.

Application filed March 23, 1915. Serial No. 16,513.

*To all whom it may concern:*

Be it known that I, THOMAS BELL, a subject of the King of Great Britain, and resident of 581 Lansdown avenue, in the city of Toronto, county of York, Province of Ontario, in the Dominion of Canada, have invented certain new and useful Improvements in Distributer-Roller Bearings for Printing-Presses, of which the following is a specification.

The invention relates to improvements in distributer roller bearings for printing presses and the like as described in the present specification and shown in the accompanying drawings that form part of the same.

The invention consists essentially in the novel construction and arrangement of parts whereby the distributer rollers are adjustably secured in their bearings and are removable therefrom.

The objects of the invention are to prevent the destruction of machines consequent upon the distributer or other rollers becoming disengaged from their bearings, to lengthen the life of printing presses in general and generally to provide a cheap, durable and efficient bearing of the class described.

In the drawings, Figure 1 is a side elevation of the distributer roller bearing showing the rollers in their positions therein and showing in dotted lines the said rollers when resting in the auxiliary bearing. Fig. 2 is a rear elevation of the distributer roller bearing. Fig. 3 is a side elevation of the adjusting block for said bearing. Fig. 4 is an end elevation of the adjusting block for said bearing. Fig. 5 is a detail of one of the metal fingers of the bearing. Fig. 6 is a detail showing the locking mechanism of the bearing. Fig. 7 is a detail of one of the metal dogs.

Like numerals of reference indicate corresponding parts in each figure.

Referring to the drawings 1 is a metal casting having the downwardly extending shaft 2 and the walls 3 and 4 extending upwardly from a point above said shaft 2, said walls 3 and 4 forming at their lower ends the bearing 5 adapted to receive the shaft 6 of the distributer roller 7.

8 is the outer portion of the wall 4 and being separated from the inner portion of said wall by a groove 9 extending downwardly to a point adjacent to the bearing 5, said outer portion 8 being offset at 10 and concaved on its inner wall 11 to form an auxiliary bearing 12 for supporting the distributer roller shaft when same is disengaged from its bearings.

13 is a bearing adjacent to the upper ends of the walls 3 and 4 above the bearing 5 and being adapted to receive the shaft 14 of the upper distributer roller 15.

16 is a shaft extending inwardly from one end of the casting 1 adjacent to the lower end thereof, said shaft being journaled at its outer end in the bearings 17 and at its inner end in the recess 18 in the inner wall of the outer portion 8 of the wall 4 and having on the outer end thereof the ratchet wheel 19.

20 is a metal finger mounted on the shaft 16 within the groove 9 and being for the purpose of locking the distributer roller shaft 6 in its position in the bearing 5.

21 is a shaft similar to the shaft 16 and extending inwardly from the outer end of the casting 1 adjacent to the upper end thereof, said shaft being journaled similarly to said shaft 16 and having mounted thereon the metal finger 22 within the groove 9 similarly to the finger 19, said finger being for the purpose of locking the distributer roller shaft 14 in its position in the bearing 13.

23 is a ratchet wheel on the outer end of the shaft 21.

24 is a shaft screw threaded into the casting 1 from the end thereof and being centrally located between the shafts 16 and 21.

25 and 26 are metal dogs loosely mounted on the shaft 24, said dogs being adapted to engage at their outer ends the ratchet wheels 19 and 23 respectively.

27 is a butterfly nut loosely mounted on the shaft 24 and having on its under side the slots 28 adapted to fit over the dogs 25 and 26 and to impart any motion thereto that might be given to said nut 27.

29 is a helical spring mounted on the shaft 24 above the butterfly nut 27 and having its end 30 engaging the slot 31 in the shaft 24 and its end 32 engaging one of the wings of the nut 27, said spring being for the purpose of keeping the dogs 25 and 26 in constant engagement with the ratchet wheels 19 and 23.

32ª is a cap screw threaded over the end of the shaft 24 and having the enlarged lower portion 33 fitting over the spring 29 and preventing the said spring from becoming disengaged from the said shaft.

It will thus be seen that when the shafts 6 and 14 of the rollers 7 and 15 are placed in their bearings 5 and 13 respectively and the fingers 20 and 22 are locked in position over said shafts by means of the dogs 25 and 26 engaging the ratchet wheels 19 and 23, the said rollers 7 and 15 are securely locked in their bearings and cannot possibly become disengaged therefrom. When it is desired to remove the upper roller 15 in order to get at the lower roller 7 or for other purposes the said upper roller may be simply laid in the auxiliary bearing 12.

34 is a bearing block having at one side thereof the inwardly extending flanges 35 forming the recess 36 adapted to engage a suitable trackway on the printing press, said bearing block being adapted to fit over the shaft 2 and to be adjustably secured thereto my means of a set screw 37 entering one side thereof and coming into engagement with the slot 38 in said shaft 2.

39 is a lock nut securing said set screw 37.

40 is a screw threaded opening in the under side of the bearing block 34 and having therein the set screw 41, said set screw being adapted to abut the lower end of the shaft 2 for the purpose of raising or lowering said shaft as required.

What I claim is:

A distributer roller bearing for printing presses comprising a holder slidably arranged on the press, a bracket adjustably supported in said holder and walls forming a vertical groove containing roller shaft bearings and an offset from one of said walls forming a roller shaft rest, upper and lower pintles journaled in suitable bearings in one of said walls, fingers fixedly secured at the inner ends of said pintles, ratchets fixedly mounted at the outer ends of said pintles, spring-held pawls engaging the upper and lower ratchets coincidently and a pin carrying the said pawls and screw threaded into wall.

Signed at the city of Toronto, Ontario, this twelfth day of August 1914.

THOMAS BELL.

Witnesses:
N. G. HAMMOND,
R. POUND.

Copies of this patent may be obtained for five cents each, by addressing the "Commissioner of Patents. Washington, D. C."